Patented Sept. 23, 1930

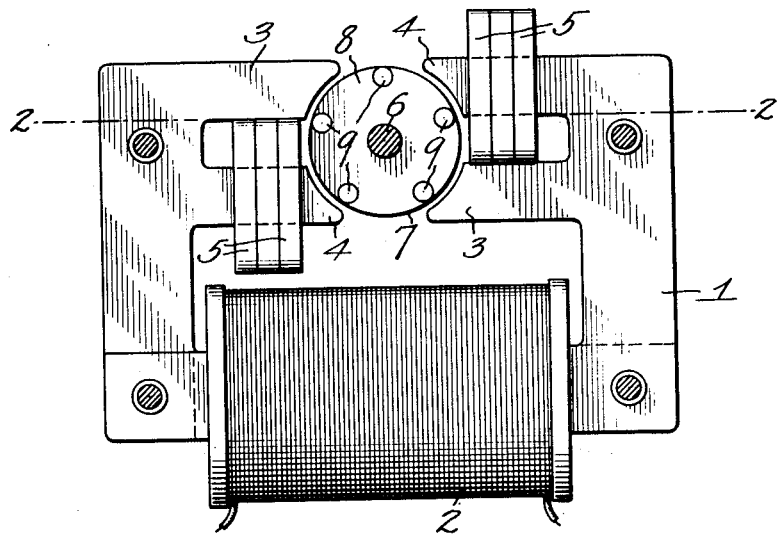
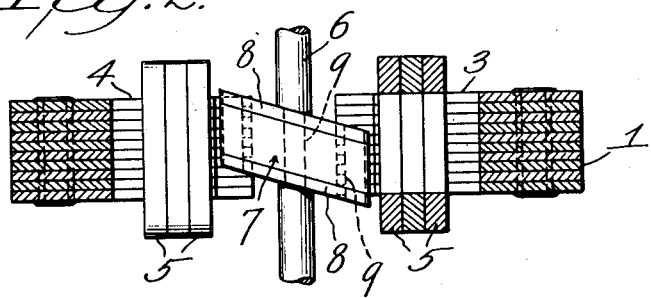
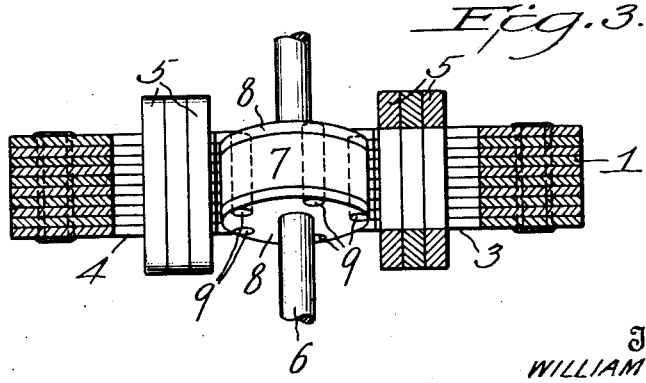

1,776,520

UNITED STATES PATENT OFFICE

WILLIAM C. NEIN AND THOMAS W. VARLEY, OF NEW YORK, N. Y., ASSIGNORS TO PAUL P. HORNI, OF NEWARK, NEW JERSEY

SELF-STARTING SYNCHRONOUS MOTOR

Application filed October 11, 1928. Serial No. 311,742.

This invention relates to electric motors adapted to run on single phase alternating current circuits and more particularly to that class of motors where the rotor has the function of starting from a state of rest and then when synchronism is approached, has within itself the power to pass into and remain in exact synchronism with the electrical alternations.

Such motors have a common and extensive use in connection with clocks and signalling devices.

It is known that in combination with a rotating field such as the customary split phase field, a rotor of the self starting induction type will have the characteristic of passing thus into synchronism if there is provided some additional feature that will cause a given diameter of the rotor to have a stronger magneto-motive force than the rest of the rotor. One well-known form has the rotor provided with a certain amount of magnetic remanence. Such rotors do not possess very strong synchronous tendencies, for if the remanence is made too strong, the rotors lose their self starting feature.

One object of the present invention is not only to increase the synchronizing tendency, but at the same time to insure a stronger self starting torque.

This object is accomplished by making the rotor of the ordinary squirrel cage form which has a most powerful starting torque, with the added feature of having the iron core elliptical in the plane of the lines of force, and this is more effectively accomplished by having the magnetic core in the form of an oblique cylinder, the section normal to the axis being circular and with ends parallel, but inclined to the axis. The usual copper end disks are preferably also inclined in the same manner. Such a rotor we have found will have the full starting torque of a squirrel cage rotor and yet when the induction torque weakens as synchronism is approached, the more favored magnetic path of the shorter axis of the ellipse causes the rotor to be brought up to exact synchronism at which speed it is held very rigidly because of the great magneto motive force involved in this type of armature. This strong tendency to synchronism does not however cause the rotor to "lock" and refuse to start because of the powerful inductive drag on the copper conductors of the cage.

An embodiment of the invention is illustrated in the accompanying drawings in which Figure 1 is a front view of the motor.
Figure 2 is a section on line 2—2 of Figure 1.
Figure 3 is a similar section with the rotor turned 90° from the position shown in Fig. 2.

A field core 1 of laminated iron has an exciting field coil 2. The field poles have each two legs 3 and 4, the latter being surrounded with copper rings 5 to cause the magneto motive force to lag in these legs behind that of the legs 3 to cause the rotation of the magnetic flux in the well-known split phase manner. A rotor shaft 6 has mounted on it a rotor core 7 of soft iron which is formed with a cylindrical periphery by being turned in a lathe and with the ends cut off diagonally to the axis on two parallel planes, a shape that can be described as an oblique cylinder. The cylindrical core is provided in the usual manner with copper end plates 8 which are joined by copper rods 9 that pass through longitudinal holes cut in the core parallel with the axis to make short circuited windings in the well-known manner of making squirrel cage rotors. There should be an odd number of bars 9 so as to minimize the tendency to prevent the rotor starting.

A desirable feature of the form just described is that the air gap reluctance is constant. Such a rotor will consequently start up with practically the same torque as an ordinary squirrel cage rotor of the same dimensions. When, however, the speed approaches synchronism and the inductive reaction is approaching a minimum, then the fact that the magnetic reluctance of the rotor core is less on one diameter than on others, and because the flux shifts transversely of the field, the rotor will have a strong tendency to turn at such speed as will bring the most favored diameter in line with the maximum magnetic flux and thereby cause the rotor to run in synchronism with the alternations of the electric current producing such maxima of magnetic fluxes.

While we have shown a preferred form of rotor that has been successfully employed to produce the desired result, we do not wish to be limited to the exact form herein specified as there are many other forms that would accomplish the same end by substantially the same means, it being only necessary to use a squirrel cage induction rotor with a soft iron core and so shape the magnetic core as to give a different magnetic reluctance at 90 degree spacings without any change occurring in the air gap reluctance. Thus in Fig. 2 the reluctance would be greater than in the position shown in Fig. 3 as in the former the length of the median line of flux is greater.

While we have shown a bipolar field, it is evident that more than one pair of poles may be used and a corresponding reduction of armature revolutions be obtained. In such case, the accentuated or minimum reluctance diameter would tend to pass each pole every half cycle.

We claim:—

1. A self-starting synchronous motor having a rotating field and a rotor with short circuited windings and iron core, the core having a continuous cylindrical magnetic periphery, and end faces oblique to the axis of the rotor to cause the rotor to run at synchronous speed.

2. A self-starting synchronous motor having a rotating field of the split phase type, and a rotor of the squirrel cage type, the rotor having an iron core with a cylindrical continuous periphery coaxial with the axis of rotation of the rotor and parallel oblique end faces, the obliquity being sufficient to give intermittent fluctuations in magnetic flux necessary to insure synchronous action.

3. A rotating field, a squirrel cage rotor turnable therein, the said rotor characterized by a continuous magnetic cylindrical periphery presenting constant areas to the field, said areas shifting transversely of the field during each half revolution.

4. A rotating field, a squirrel cage rotor turnable therein, the rotor having a continuous magnetic cylindrical periphery presenting no dead points when at rest and characterized by a shifting of the magnetic flux across the field parallel with the axis.

WILLIAM C. NEIN.
THOMAS W. VARLEY.